United States Patent
Sjögren et al.

(10) Patent No.: US 12,269,688 B2
(45) Date of Patent: Apr. 8, 2025

(54) CONVEYOR APPARATUS FOR PACKAGES AND ACCUMULATOR HAVING A CONVEYING APPARATUS

(71) Applicant: TETRA LAVAL HOLDINGS & FINANCE S.A., Pully (CH)

(72) Inventors: Magnus Sjögren, Lund (SE); Pär Roslund, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 89 days.

(21) Appl. No.: 18/352,793

(22) Filed: Jul. 14, 2023

(65) Prior Publication Data

US 2024/0083687 A1 Mar. 14, 2024

(30) Foreign Application Priority Data

Sep. 13, 2022 (EP) .................................... 22195301

(51) Int. Cl.
  *B65G 23/44* (2006.01)
  *B65G 21/20* (2006.01)
  *B65G 47/84* (2006.01)

(52) U.S. Cl.
  CPC .......... *B65G 23/44* (2013.01); *B65G 21/2054* (2013.01); *B65G 47/846* (2013.01); *B65G 2201/0235* (2013.01)

(58) Field of Classification Search
  CPC .. B65G 23/44; B65G 47/5104; B65G 47/846; B65G 21/2054

(Continued)

(56) References Cited

U.S. PATENT DOCUMENTS 2,463,273 A * 3/1949 Holstein ................ B65G 23/44
                                                     198/810.04
3,150,758 A * 9/1964 Johnson ............... B65G 47/846
                                                        198/723

(Continued)

FOREIGN PATENT DOCUMENTS

CN       109019064 A  * 12/2018  ............. B65G 23/44
DE   102018005609 A1 *  1/2020  ......... B65G 21/2054

(Continued)

OTHER PUBLICATIONS

Extended European Search Report issued on Mar. 22, 2023, by the European Patent Office in counterpart European Patent Application No. 22195301.1. (5 pages).

*Primary Examiner* — James R Bidwell
(74) *Attorney, Agent, or Firm* — BUCHANAN INGERSOLL & ROONEY PC

(57) ABSTRACT

A conveying apparatus for advancing packages from an inlet station to an outlet station comprises an intermediate track between the inlet and outlet stations, an endless belt to engage the packages during advancement along at least the track; and a tensioning device to tension the endless belt. The tensioning device comprises a spring unit comprising first and second spring assemblies having first and second pre-loaded spring forces respectively, with the second spring force larger than the first spring force. The conveying apparatus is in a rest configuration in the absence of packages along the track and is in a loaded configuration with plural packages arranged along the track. The first spring assembly determines the spring force of the spring unit when the conveying apparatus is in the rest configuration and the second spring assembly determines the spring force of the spring unit when the conveying is in the loaded configuration.

15 Claims, 5 Drawing Sheets

(58) Field of Classification Search
USPC .......................................................... 198/814
See application file for complete search history.

(56) References Cited

U.S. PATENT DOCUMENTS

| | | | | |
|---|---|---|---|---|
| 3,363,741 | A * | 1/1968 | Dierksheide | B65G 47/82 |
| | | | | 198/457.07 |
| 6,230,874 | B1 | 5/2001 | Steeber et al. | |
| 6,698,581 | B2 * | 3/2004 | Steeber | B65G 47/52 |
| | | | | 198/370.01 |
| 8,936,147 | B2 * | 1/2015 | Knas | B65G 23/44 |
| | | | | 198/814 |
| 2007/0068774 | A1 * | 3/2007 | Giometti | B65G 15/20 |
| | | | | 198/626.1 |
| 2021/0245958 | A1 | 8/2021 | Heuft et al. | |

FOREIGN PATENT DOCUMENTS

| | | | | |
|---|---|---|---|---|
| EP | 3228565 | B1 | 8/2019 | |
| JP | 2017186056 | A * | 10/2017 | ......... B65G 21/2036 |

\* cited by examiner

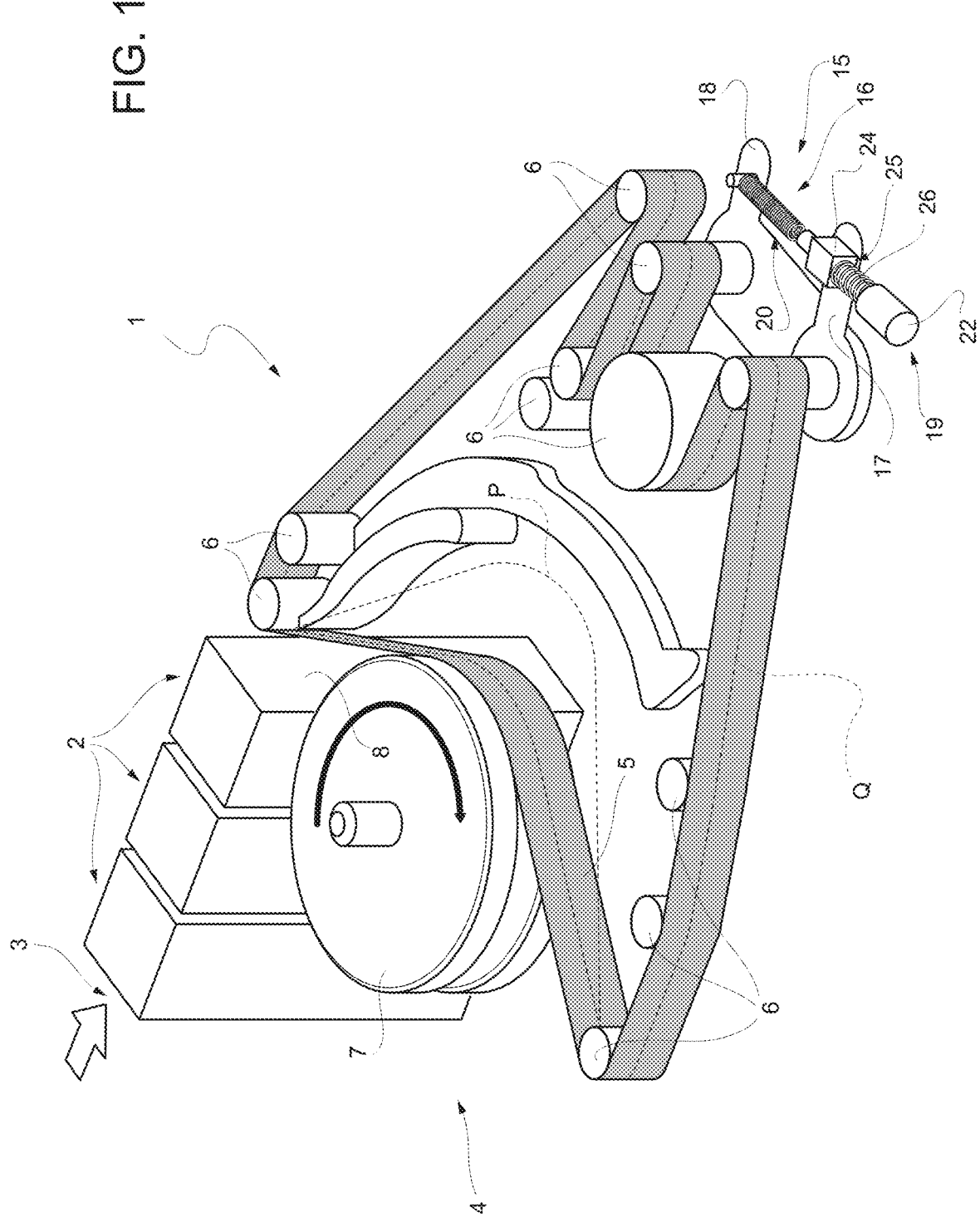

CONVEYOR APPARATUS FOR PACKAGES AND ACCUMULATOR HAVING A CONVEYING APPARATUS

TECHNICAL FIELD

The present invention relates to a conveying apparatus for conveying packages, preferentially packages filled with a pourable product, more preferentially packages filled with a pourable food product.

Advantageously, the present invention also relates to an accumulator for accumulating packages, preferentially packages filled with a pourable product, more preferentially packages filled with a pourable food product, and having a conveying apparatus.

BACKGROUND ART

As is known, many liquid or pourable food products, such as fruit juice, UHT (ultra-high-temperature treated) milk, wine, tomato sauce, etc., are sold in packages made of sterilized packaging material.

A typical example is the parallelepiped-shaped package for liquid or pourable food products known as Tetra Brik Aseptic (registered trademark), which is made by sealing and folding a laminated packaging material. The packaging material has a multilayer structure comprising a base layer, e.g. of paper or cardboard, covered on both sides with layers of heat-seal plastic material, e.g. polyethylene. In the case of aseptic packages for long-storage products, such as UHT milk, the packaging material also comprises a layer of oxygen-barrier material (an oxygen-barrier layer), e.g. an aluminum foil, which is superimposed on a layer of heat-seal plastic material, and is in turn covered with another layer of heat-seal plastic material forming the inner face of the package eventually contacting the food product.

Packages of this sort are normally produced within packaging plants comprising at least one automatic packaging apparatus, which advances and sterilizes a web of packaging material, which is then formed into a tube and filled with the pourable product and is finally sealed, formed and cut.

A typical packaging plant also comprises downstream handling apparatuses, which handle and/or treat the formed and filled packages.

It is e.g. known to rely on dynamic accumulators, which allows to dynamically accumulate packages within the accumulator. Known accumulators comprise an inlet track receiving the packages and designed to allow for the introduction of the packages into the accumulator and an outlet track for feeding the packages out of the accumulator.

Moreover, the known accumulators comprise a conveying apparatus acting as a transfer apparatus for transferring the packages from the inlet track to the outlet track. The conveying apparatus may be moveable with respect to the inlet track and the outlet track so as to modulate the accumulation capacity of the accumulator.

The conveying apparatus advances the packages from a respective inlet station corresponding to a station at which the packages are still on the inlet track to a respective outlet station at which the packages are on the outlet track. The conveying apparatus comprises an intermediate track interposed between the inlet station and the outlet station and an endless belt configured to engage respective side walls of the packages during advancement of the packages along the intermediate track. The conveying apparatus also comprises a tensioning device configured to tension the endless belt. In particular, the tensioning device comprises at least a fixed portion and a moveable portion moveable upon interaction of the endless belt with the packages and a spring assembly connected to the fixed portion and the moveable portion and configured to guarantee for the desired tensioning of the endless belt.

Even though, the known conveying apparatuses achieve excellent working results, a desire is felt in the sector to further improve the known conveying apparatuses.

DISCLOSURE OF INVENTION

It is an object of the present invention to provide an improved conveying apparatus, preferentially an improved conveying apparatus for transferring packages from a first track to a second track.

It is a further object of the present invention, to provide an improved accumulator having a conveying apparatus for transferring packages from an inlet track to an outlet track of the accumulator.

According to the present invention, there is provided a conveying apparatus as claimed in claim 1.

Preferred non-limiting embodiments of the conveying apparatus are claimed in the respective dependent claims.

According to the present invention, there is also provided an accumulator according to claim 15.

BRIEF DESCRIPTION OF THE DRAWINGS

Two non-limiting embodiments of the present invention will be described by way of example with reference to the accompanying drawings, in which:

FIG. 1 is a schematic perspective view of a conveying apparatus according to a first embodiment of the present invention, with parts removed for clarity;

BEST MODES FOR CARRYING OUT THE INVENTION

Figure 2A:
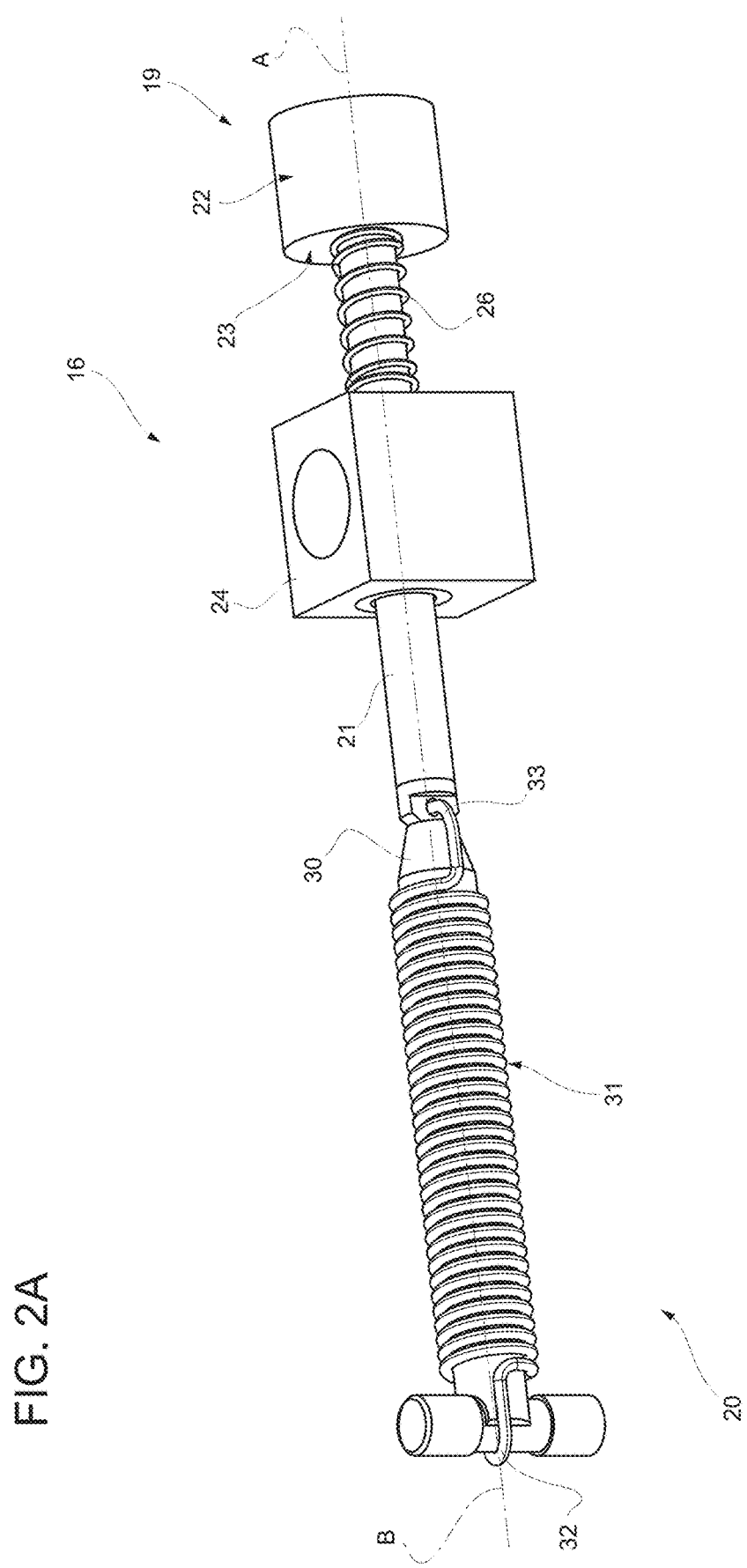
FIGS. 2A to 2C show a detail of the conveying apparatus of FIG. 1 while being in different configurations, with parts removed for clarity.

Number 1 indicates as a whole a conveying apparatus for advancing packages 2, preferentially packages 2 filled with a pourable product, even more preferentially packages 2 filled with a pourable food product.

Packages 2 may be filled with a pourable food product such as milk, fruit juice, wine, tomato sauce, emulsions, beverages with pulp, milk drinks, coffee drinks, yoghurt, yoghurt drinks, sugar, salt and the like.

Packages may be formed from a multilayer packaging material, polymers, glass, metal, composites or the like.

According to some possible embodiments, packages may be provided in the form of composite packages, bottles, cans or the like.

According to some preferred non-limiting embodiments, packages may be at least partially formed from a multilayer packaging material comprising at least a layer of fibrous material, such as e.g. a paper or cardboard layer, and at least two layers of heat-seal plastic material, e.g. polyethylene, interposing the layer of fibrous material in between one another. Preferentially, one of these two layers of heat-seal plastic material may define an inner face of package 2 eventually contacting the pourable product.

Moreover, the multilayer packaging material may also comprise a layer of gas- and light-barrier material, e.g. aluminum foil or ethylene vinyl alcohol (EVOH) film, preferentially being arranged between one of the layers of the heat-seal plastic material and the layer of fibrous material.

Additionally, the multilayer packaging material may also comprise a further layer of heat-seal plastic material being interposed between the layer of gas- and light-barrier material and the layer of fibrous material.

According to some possible non-limiting embodiments, packages can be fully formed from the multilayer packaging material.

According to some alternative embodiments, packages could comprise a main body formed from the multilayer packaging material and one or more additional components, such as an opening device, a straw, information material or the like, attached to the main body. In particular, the additional components may not be formed from a multilayer packaging material.

With particular reference to FIG. 1, conveying apparatus 1 may be configured to advance packages 2, preferentially a succession of packages 2, from an inlet station 3 to an outlet station 4.

In further detail, conveying apparatus 1 may comprise:
an intermediate track interposed between inlet station 3 and outlet station 4; and
an endless belt 5 configured to engage packages 2 during advancement of packages 2 along the intermediate track, preferentially along an intermediate path P defined by intermediate track.

In more detail, endless belt 5 may be configured to advance along an endless path Q.

Preferentially, conveying apparatus 1 may comprise an actuator, e.g. an electric motor, configured to actuate advancement of endless belt 5 along endless path Q.

Even more preferentially, conveying apparatus 1 may also comprise a plurality of rollers 6, in particular endless belt 5 being wound about rollers 6 thereby defining endless path Q.

Moreover, conveying apparatus 1 may also comprise a driven wheel 7, preferentially coupled to a respective actuating device for actuating a rotation of driven wheel 7 around a respective rotation axis.

Preferentially, packages 2 may be interposed between driven wheel 7 and endless belt 5 during advancement of packages 2 along the intermediate track, preferentially along intermediate path P.

Even more preferentially, advancement of packages 2 may be controlled by the rotation of driven wheel 7 and/or advancement of endless belt 5 along endless path Q.

According to some preferred non-limiting embodiments, rotation of driven wheel 7 and advancement of endless belt 5 along endless path Q may be coordinated with respect to one another, preferentially so as to advance packages 2 along intermediate path P.

According to some preferred non-limiting embodiments, endless belt 5 and/or driven wheel 7 may be configured to engage packages 2 at their respective side walls 7.

According to some preferred non-limiting embodiments, conveying apparatus 1 may also comprise an intermediate support (not shown in FIG. 1) configured to support packages 2 during their advancement along intermediate path P.

According to some preferred non-limiting embodiments, the intermediate track (and accordingly also intermediate path P) may be arc-shaped.

Preferentially, conveying apparatus 1 may also comprise an inlet track portion, preferentially having a linear shape, and an outlet track portion, preferentially having a linear shape. Preferentially the intermediate track may be interposed between the inlet track portion and the outlet track portion.

More specifically, the inlet track portion may extend from inlet station 3 to the intermediate track and the outlet track portion may extend from the intermediate track to outlet station 4.

As will be explained in more detail further below, conveying apparatus 1 may be configured to act as a transfer apparatus for transferring packages 2 from a first advancement track, preferentially an inlet track of an accumulator, to a second advancement track, preferentially an outlet track of an accumulator. Preferentially, packages 2 may advance along first advancement track into a first advancement direction and along second advancement track into a second advancement direction opposite to the first advancement direction.

With particular reference to FIG. 1, conveying apparatus 1 may be in a rest configuration in the case of the absence of any package 2 along the intermediate track and may be in a loaded configuration with a plurality of packages 2 being arranged along the intermediate track.

FIG. 1 shows the situation of conveying apparatus 1 being still in the rest configuration and starting to be controlled by the entrance of packages 2 into the loaded configuration.

In more detail, when conveying apparatus 1 may be in the rest configuration, endless belt 5 may be in contact with driving wheel 7 and/or when conveying apparatus 1 may be in the loaded configuration, packages 2 may be interposed between and may be in contact with driving wheel 7 and endless belt 5.

With particular reference to FIG. 1, conveying apparatus 1 may also comprise a tensioning device 15 configured to tension endless belt 15.

Tensioning device 15 may comprise a spring unit 16 delivering a spring force, preferentially for tensioning endless belt 5, even more preferentially so as to provide for the (needed/desired) tensioning force acting on endless belt 5.

Additionally, tensioning device 15 may comprise a tensioning mechanism coupled to, in particular indirectly coupled to endless belt 5, and spring unit 16.

Preferentially, the tensioning mechanism may comprise a fixed portion 17 and a moveable portion 18 being moveable, preferentially moveable as a result of interaction of endless belt 5 with packages 2.

More specifically, moveable portion 18 may be coupled to and/or may carry one or more rollers 6.

According to some preferred non-limiting embodiments, spring unit 16 may be connected to fixed portion 17 and moveable portion 18.

Figure 2B:
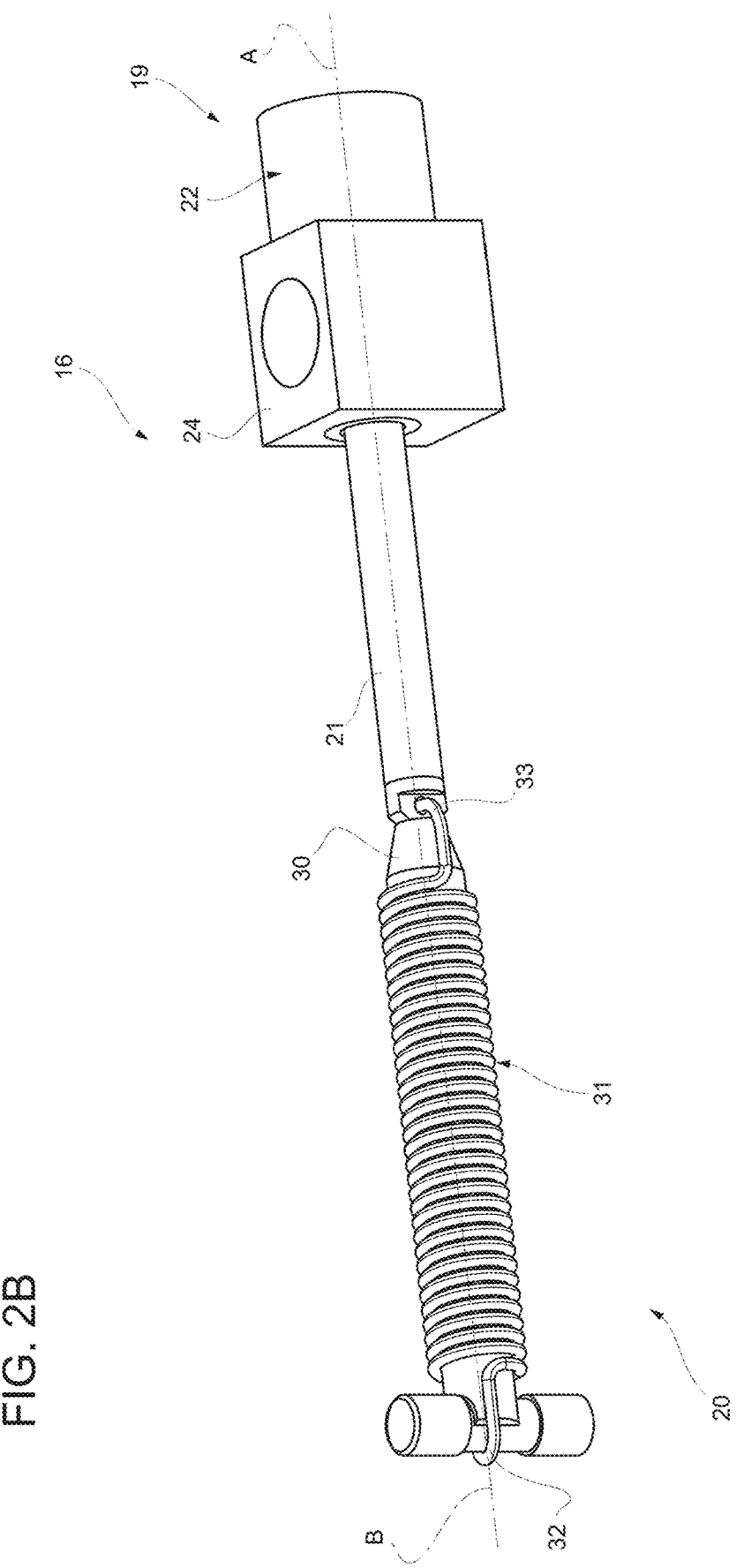
Figure 2C:
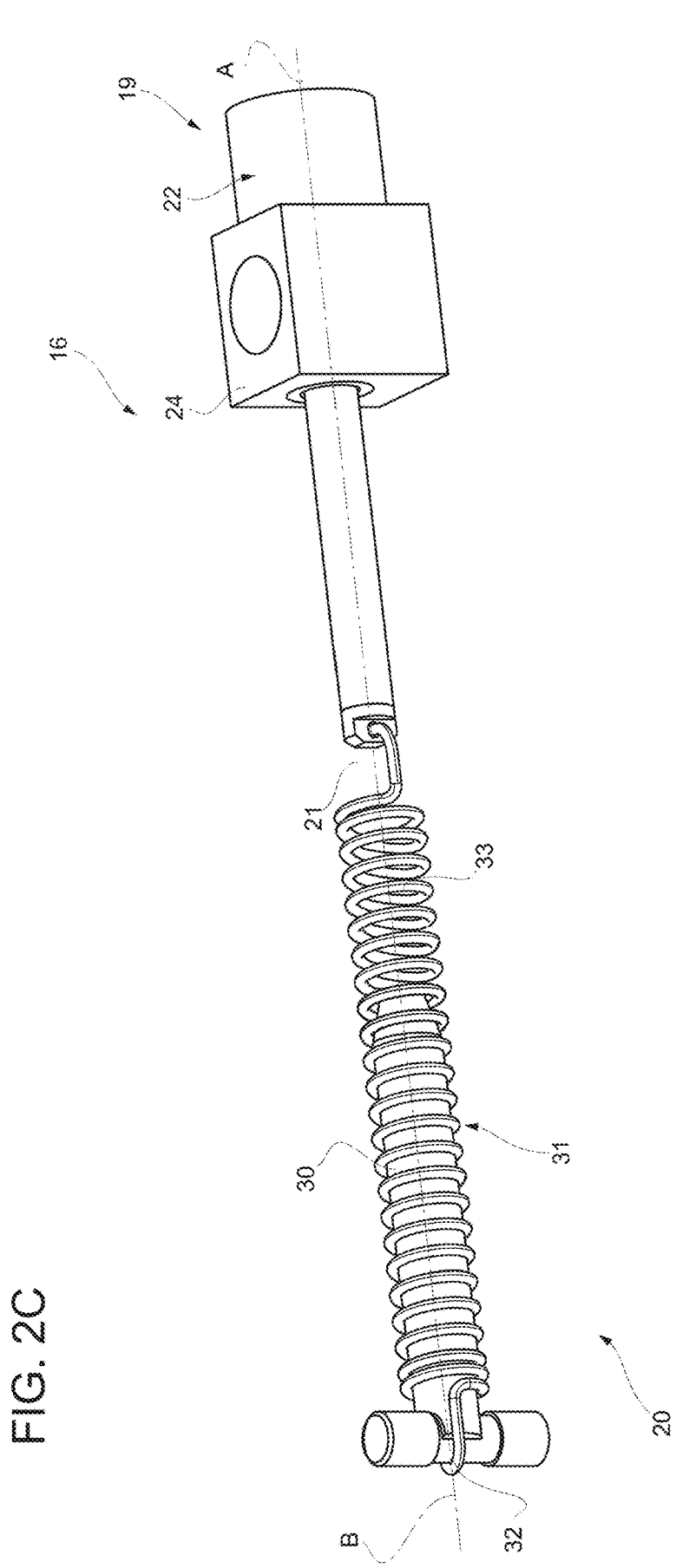

With particular reference to FIGS. 2A to 2C, spring unit 16 may comprise a first spring assembly 19 having and/or delivering and/or providing a first pre-loaded spring force and a second spring assembly 20 having and/or delivering and/or providing a second pre-loaded spring force larger than the first pre-loaded spring force.

Advantageously, spring unit 16 may be configured such that first spring assembly 19 determines the spring force of spring unit 16 in the case of conveying apparatus 1 being in the rest configuration (see FIG. 2A) and second spring assembly 20 determines the spring force of spring unit 16 in the case of conveying apparatus 1 being in the loaded configuration (see FIG. 2C).

In this case, when, in use, packages 2 start to be brought into contact with endless belt 5 one obtains a gentle interaction between at least the first package 2 and endless belt 5, while afterwards when the intermediate track is loaded with packages 2 one guarantees a good engagement of packages 2 with endless belt 2.

It should be noted that the term that the first spring assembly 19 determines the spring force of spring unit 16 indicates that second spring assembly 20 is not influencing the spring force, as preferentially occurring during at least the start of the control of conveying apparatus 1 from the rest configuration to the loaded configuration. Moreover, afterwards, the term that the second spring assembly 20 determines the spring force of spring unit 16 indicates that first spring assembly 19 is not influencing the spring force of spring unit 16.

According to some preferred non-limiting embodiments, first spring assembly 19 may be configured such that the first pre-loaded spring force ranges between 5 N to 17 N, preferentially between 7 N and 12 N, even more preferentially may equal 8 N.

According to some preferred non-limiting embodiments, second spring assembly 20 may be configured such that the second pre-loaded spring force is larger than 17 N, preferentially ranges between 17 N and 30 N, even more preferentially ranges between 20 N to 27 N.

As will be shown in more detail in the following, according to the embodiment of FIGS. 2A to 2C, both first spring assembly 19 and second spring assembly 20 operate by means of mechanical spring forces; i.e. mechanical interactions of respective portions of first spring assembly 19 define the first pre-loaded spring force and mechanical interactions of respective portions of second spring assembly 20 define the second pre-loaded spring force.

Figure 3:
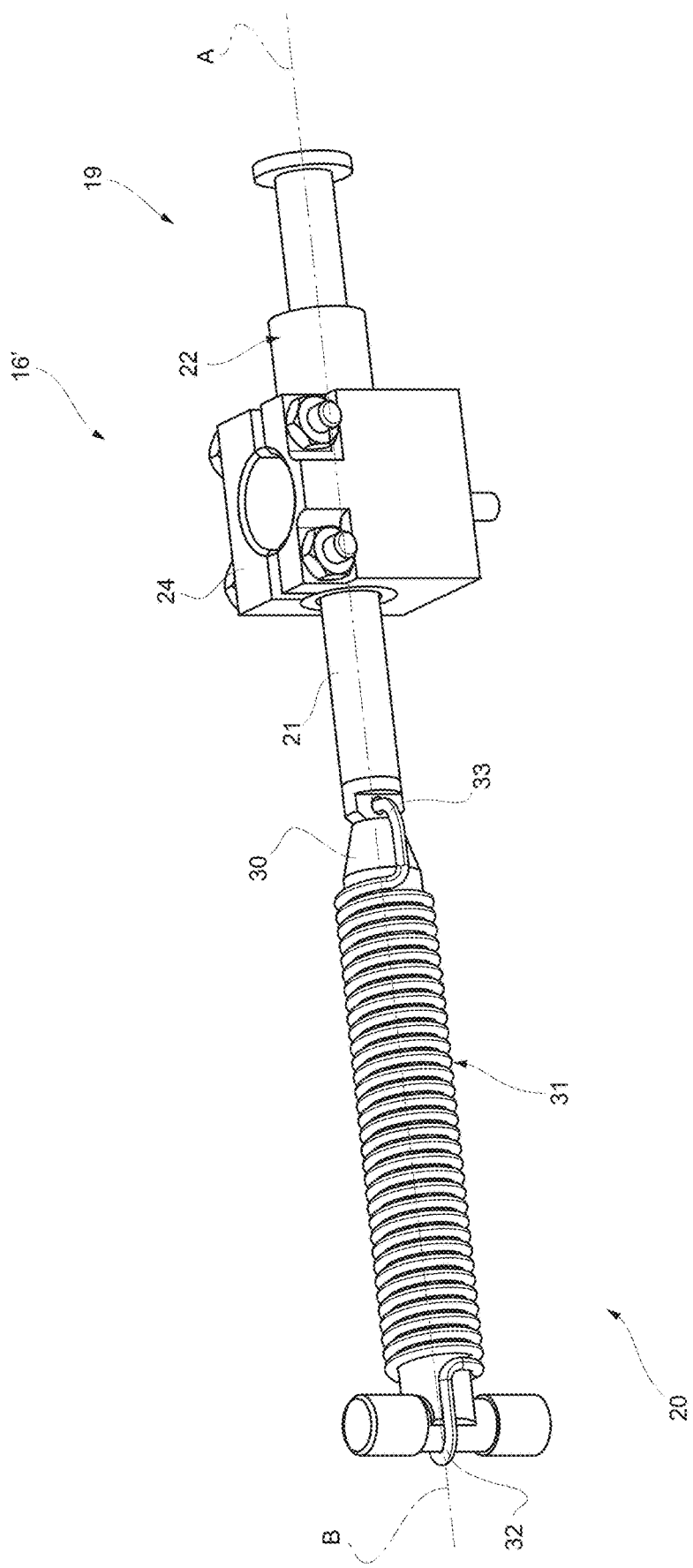
FIG. 3 illustrates a detail of a conveying apparatus according to a second embodiment of the present invention, with parts removed for clarity.

However and as will be shown in more detail with reference to the embodiment of FIG. 3, first spring assembly 19 and/or second spring assembly 20 may operate by means of magnetic forces.

According to some preferred non-limiting embodiments, one of first spring assembly 19 and second spring assembly 20 may be connected to fixed portion 17 and the other one of first spring assembly 19 and second spring assembly 20 may be connected to moveable portion 18. In the specific example shown, first spring assembly 19 is connected to fixed portion 17 and second spring assembly 20 is connected to moveable portion 18.

With particular reference to the embodiment of FIGS. 2A to 2C, first spring assembly 19 and second spring assembly 20 may be connected, preferentially mechanically connected, to one another.

According to some preferred non-limiting embodiments, first spring assembly 19 may comprise a rod 21, an interaction body 22 connected, preferentially integrally connected, to rod 21 and having an engagement surface 23 and a reference body 24 having an abutment surface 25.

In further detail, first spring assembly 19 may be controllable into:
an idle configuration (see FIG. 2A) at which engagement surface 23 and abutment surface (25) may be distanced from one another; and
an interaction configuration (see FIGS. 2B and 2C) at which engagement surface 23 abuts against abutment surface 25.

Preferentially, rod 21 may extend along a longitudinal axis A.

Preferentially, rod 21 may be linearly moveable, preferentially along longitudinal axis A, and interaction body 22 may be integrally connected to rod 21 so as to move together with rod 21.

Preferentially, control of first spring assembly 19 between the idle configuration and the interaction configuration occurs by a linear movement, preferentially along longitudinal axis A, of rod 21 and therewith interaction body 22.

Preferentially, abutment surface 25 may define an end of stroke for rod 21 and/or interaction body 22.

According to some preferred non-limiting embodiments, reference body 24 may comprise a through-passage and rod 21 may be partially and moveably arranged within the through-passage.

According to some preferred non-limiting embodiments, when, in use, conveying apparatus 1 may be in the rest configuration and the loaded configuration, first spring assembly 19 may be in respectively the idle configuration and the interaction configuration.

According to some preferred non-limiting embodiments, in use, during a loading of the intermediate track with packages 2, first spring assembly 19 is controlled from the idle configuration to the interaction configuration, preferentially by a linear movement of rod 21 and interaction body 22.

According to some preferred non-limiting embodiments, rod 21 may comprise a first end and a second end opposed to the first end.

Preferentially, the first end may be connected to second spring assembly 20 and/or the second end may be integrally connected to interaction body 22.

Moreover, reference body 24 may be interposed between the first end and interaction body 22.

In further detail, interaction body 22 may be cylindrically shaped. Preferentially, longitudinal axis A may be parallel or even coaxial to a symmetry axis of interaction body 22.

Alternatively, interaction body 22 may also have other shapes than the one illustrated in the specific embodiment of FIGS. 1 to 2C.

In more detail, reference body 24 may be cuboid-shaped. Preferentially, longitudinal axis A may be parallel or even coaxial to a symmetry axis of reference body 24.

Alternatively, reference body 24 may also have other shapes than the one illustrated in the specific embodiment of FIGS. 1 to 2C.

According to some preferred non-limiting embodiments, reference body 24 may be fixed to fixed portion 17.

According to some preferred non-limiting embodiments, first spring assembly 19 may comprise a spring element 26 compressed between interaction body 22 and reference body 24, preferentially between engagement surface 23 and abutment surface 25.

Moreover, compressed spring element 26 may define the first pre-loaded spring force.

Preferentially, spring element 26 may surround rod 21.

With particular reference to FIGS. 2B and 2C, second spring assembly 20 may start, in use, to determine the spring force of spring unit 16 after first spring assembly 19 being controlled in the interaction configuration. In this way, one guarantees that after loading of the intermediate track, the tension of endless belt 5 is determined by second spring assembly 20 and is larger than prior to starting the loading of the intermediate track.

According to the specific non-limiting embodiment shown, second spring assembly 20 may comprise a bar 30 and a tension spring member 31 surrounding bar 30. Preferentially, tension spring member 31 defines the second pre-loaded spring force.

Preferentially, spring member 31 may be connected to bar 30 and/or to first spring assembly 19, preferentially rod 21, even more preferentially the first end of rod 21.

More specifically, spring member 31 may comprise a first terminal portion 32 and a second terminal portion 33 opposite to the first terminal portion.

Preferentially, the first terminal portion may be fixed to bar 30 and second terminal portion may be connected to the first end of rod 21.

According to some preferred non-limiting embodiments, bar 30 may be connected to moveable portion 30.

Preferentially, when conveying apparatus 1 is in the loaded configuration, any movement of bar 30 as a result of the interaction of packages 2 with endless belt 5 may lead to an extension or compression of spring member 31 (see e.g. FIGS. 2B and 2C).

According to some preferred non-limiting embodiments, bar 30 may extend along a longitudinal axis B, preferentially parallel, even more preferentially coaxial, to longitudinal axis A.

According to some possible non-limiting embodiments, an accumulator for accumulation of packages 2 may comprise conveying apparatus 1.

Preferentially, the accumulator may comprise an inlet track allowing to receive and feed packages 2 into and within the accumulator and an outlet track allow to advance packages 2 out of the accumulator.

E.g. inlet track and outlet track may comprise each a respective conveyor belt configured to support and advance packages 2.

Conveying apparatus 1 may be configured to act as a transfer device so as to transfer packages 2 from the inlet track to the outlet track.

Preferentially, the intermediate track may be interposed between the inlet track and the outlet track.

Moreover, inlet station 3 may be adjacent to the inlet track for receiving packages 2 from the inlet track and outlet station 4 may be adjacent to the outlet track for delivering packages 2 to the outlet track.

Preferentially, conveying apparatus 1 may be moveable with respect to the inlet track and the outlet track so as to modulate the accumulation capacity of the accumulator. In other words, by having conveying apparatus 1 being moveable with respect to the inlet track and the outlet track, it is possible to render the accumulator as a dynamic accumulator.

In use, conveying apparatus 1 advances packages 2. With conveying apparatus 1 being in the rest configuration, it is first spring assembly 19 determining the tension of endless belt 5.

Moreover, when at least the first package 2 is fed along the intermediate track, it is still the first spring assembly 19, which determines the tension force of endless belt 5, while at some point, preferentially with engagement surface 23 abutting against abutment surface 25, it is second spring assembly 20, which determines the tensioning of endless belt 5.

With reference to FIG. 3, number 16' indicates an alternative embodiment of a spring unit according to a second embodiment of the present invention; as spring unit 16' is similar to spring unit 16, the following description is limited to the differences between them, and using the same references, where possible, for identical or corresponding parts.

In particular, spring unit 16' differs from spring unit 16 in that first spring assembly 19 operates by means of magnetic force (i.e. first spring assembly 19 is a magnetic spring).

In more detail, rod 21 may comprise a magnetic element and reference body 24 may comprise a magnetic member.

The magnetic interaction between the magnetic element and the magnetic member defines the first pre-loaded spring force.

Preferentially, no spring element 26 is provided.

According to some possible non-limiting embodiments, first spring assembly 19 acting by means of magnetic forces may be configured such that the first pre-loaded spring force may equal 17 N and the second pre-loaded spring force may be 20 N.

As operation of conveying apparatus 1 having spring unit 16' is similar to operation of conveying apparatus 1 having spring unit 16, we refer to the above-provided description.

The advantages of conveying apparatus 1 according to the present invention will be clear from the foregoing description.

In particular, while the first package 2 or the first packages 2 of the succession of packages 2 starts to interact with endless belt 5 the tensioning of endless belt 5 is determined by first spring assembly 19 allowing for a more gentle interaction. In such a way, the risk of damaging the first package or the first packages is reduced. Afterwards, the tension of endless belt 5 is increased due to second spring assembly 20 determining the spring force of spring unit 16, which improves advancement of packages 2.

Clearly, changes may be made to packaging machine 1 or the method as described herein without, however, departing from the scope of protection as defined in the accompanying claims.

According to some possible non-limiting embodiments, not shown, second spring assembly 20 may operate by means of magnetic forces.

The invention claimed is:

1. Conveying apparatus for advancing packages from an inlet station to an outlet station and comprising:
   an intermediate track interposed between the inlet station and the outlet station;
   an endless belt configured to engage the packages during advancement of the packages along at least the intermediate track; and
   a tensioning device configured to tension the endless belt;
   wherein the tensioning device comprises a spring unit delivering a spring force and comprising a first spring assembly having a first pre-loaded spring force and a second spring assembly having a second pre-loaded spring force larger than the first pre-loaded spring force;
   wherein the conveying apparatus is in a rest configuration in the case of the absence of any package along the intermediate track and is in a loaded configuration with a plurality of packages being arranged along the intermediate track; and
   wherein the spring unit, is configured such that the first spring assembly determines the spring force of the spring unit, in the case of the conveying apparatus being in the rest configuration and the second spring assembly determines the spring force of the spring unit in the case of the conveying apparatus being in the loaded configuration.

2. Conveying apparatus according to claim 1, wherein the first spring assembly and/or the second spring assembly operate by magnetic forces and/or mechanical spring forces.

3. Conveying apparatus according to claim 1,
   wherein the tensioning device comprises a fixed portion and a moveable portion moveable upon interaction of the endless belt with the packages;
   wherein one of the first spring assembly and the second spring assembly is connected to the fixed portion and the other one of the first spring assembly and the second spring assembly is connected to the moveable portion.

4. Conveying apparatus according to claim 1, wherein the first spring assembly comprises a rod, an interaction body connected to the rod and having an engagement surface and a reference body having an abutment surface;
  wherein the first spring assembly is controllable into:
    an idle configuration at which the engagement surface, and the abutment surface are distanced from one another; and
    an interaction configuration at which the engagement surface abuts against the abutment surface;
  wherein, in use, during a loading of the intermediate track with the packages, the first spring assembly is controlled from the idle configuration to the interaction configuration.

5. Conveying apparatus according to claim 4, wherein the reference body comprises a through-passage and the rod is partially and moveably arranged within the through-passage;
  wherein a first end of the rod is connected to the second spring assembly; and
  wherein the reference body is interposed between the first end and the interaction body.

6. Conveying apparatus according to claim 4, wherein the interaction body moves, in use, together with the rod during control of the first spring assembly from the idle configuration to the interaction configuration.

7. Conveying apparatus according to claim 4, wherein the second spring assembly starts, in use, to determine the spring force after the first spring assembly being controlled in the interaction configuration.

8. Conveying apparatus according to claim 4, wherein the reference body is connected to a fixed portion of the conveying apparatus.

9. Conveying apparatus according to claim 4, wherein the first spring assembly comprises a spring element compressed between the engagement surface and the abutment surface;
  wherein the compressed spring element defines the first pre-loaded spring force.

10. Conveying apparatus according to claim 9, wherein the spring element surrounds the rod.

11. Conveying apparatus according to claim 4, wherein the reference body comprises a through-passage and the rod is partially and moveably arranged within the through-passage;
  wherein the rod comprises a magnetic element and the reference body comprises a magnetic member; and
  wherein the magnetic interaction between the magnetic element and the magnetic member defines the first pre-loaded spring force.

12. Conveying apparatus according to claim 1, wherein the second spring assembly comprises a bar and a tension spring member surrounding the bar and being connected to the first spring assembly.

13. Conveying apparatus according to claim 12, wherein the bar is connected to a moveable portion of the conveying apparatus, wherein the moveable portion is moveable upon interaction of the packages with the endless belt.

14. Conveying apparatus according to claim 1, wherein the endless belt is arranged such to interact with side walls of the packages.

15. Accumulator for accumulating packages, comprising:
  an inlet track;
  an outlet track; and
  a conveying apparatus according to claim 1 and configured to transfer the packages from the inlet track to the outlet track.

* * * * *